US00RE49624E

(19) United States
(12) Reissued Patent
Nalley et al.

(10) Patent Number: US RE49,624 E
(45) Date of Reissued Patent: Aug. 29, 2023

(54) ELECTRONICALLY ACTUATED DUMBBELL WEIGHT TRAINING DEVICE HAVING SELECTIVELY CONNECTED WEIGHT PLATES

(71) Applicant: Mark Nalley, Murrieta, CA (US)

(72) Inventors: Mark Nalley, Murrieta, CA (US); Robert Knight, Murrieta, CA (US)

(73) Assignee: Mark Nalley, Murrieta, CA (US)

(21) Appl. No.: 17/361,019

(22) Filed: Jun. 28, 2021

Related U.S. Patent Documents

Reissue of:
(64) Patent No.: 10,843,028
Issued: Nov. 24, 2020
Appl. No.: 16/016,267
Filed: Jun. 22, 2018

(51) Int. Cl.
*A63B 21/075* (2006.01)
*A63B 21/06* (2006.01)
(Continued)

(52) U.S. Cl.
CPC ..... *A63B 21/075* (2013.01); *A63B 21/0058* (2013.01); *A63B 21/0604* (2013.01); *A63B 21/0726* (2013.01); *A63B 21/4035* (2015.10); *A63B 24/0087* (2013.01); *A63B 71/0622* (2013.01); *A63B 2071/0675* (2013.01); *A63B 2220/40* (2013.01); *A63B 2220/51* (2013.01); *A63B 2220/833* (2013.01); *A63B 2225/20* (2013.01); *A63B 2225/50* (2013.01)

(58) Field of Classification Search
CPC ..... A63B 21/0604; A63B 24/0087; A63B 21/0058; A63B 21/075; A63B 21/0726; A63B 21/4035; A63B 2220/833; A63B 2225/20; A63B 2220/40; A63B 2071/0675; A63B 71/0622; A63B 2220/51; A63B 2225/50
See application file for complete search history.

(56) References Cited

U.S. PATENT DOCUMENTS 6,719,674 B2 * 4/2004 Krull ..... A63B 21/0728 482/106
6,855,097 B2 * 2/2005 Krull ..... A63B 21/0728 482/107

(Continued)

FOREIGN PATENT DOCUMENTS

KR 10-2010-0118783 A 11/2010

*Primary Examiner* — William C Doerrler
(74) *Attorney, Agent, or Firm* — Knobbe Martens Olson & Bear LLP

(57) ABSTRACT

Disclosed is a dumbbell to be used during a weight lifting exercise program. The dumbbell includes a handle assembly and a pair of collars connected at opposite sides of the assembly. First and second sets of weight plates are detachably connected to each other and to the pair of collars. Each weight plate has an electric motor carried in a cavity formed therein. The dumbbell is seated in a portable dumbbell tray which includes a touch activated display at which a user can enter a predetermined weight to be lifted by the dumbbell during his exercise. The dumbbell tray also has a processor and a motor controller by which the electric motors of respective weight plates are selectively activated to cause the weight plates to be connected together to correspond with the weight entered by the user at the display.

24 Claims, 11 Drawing Sheets

(51) Int. Cl.

| | |
|---|---|
| ***A63B 24/00*** | (2006.01) |
| ***A63B 21/005*** | (2006.01) |
| ***A63B 21/072*** | (2006.01) |
| ***A63B 21/00*** | (2006.01) |
| ***A63B 71/06*** | (2006.01) |

(56) References Cited

U.S. PATENT DOCUMENTS 7,066,867 B2 * 6/2006 Krull ..... A63B 21/072 482/107
7,534,199 B2 * 5/2009 Krull ..... A63B 21/075 482/107
7,578,771 B1 * 8/2009 Towley, III ..... A63B 21/0728 482/106
7,588,520 B2 9/2009 Nalley
8,075,458 B2 * 12/2011 Nalley ..... A63B 21/0615 482/94
8,708,870 B2 * 4/2014 Nalley ..... A63B 21/063 482/98
9,339,681 B1 * 5/2016 Nalley ..... A63B 21/063
9,956,451 B1 * 5/2018 Wang ..... A63B 21/075
10,099,083 B1 * 10/2018 Owusu ..... A63B 24/0062
2009/0048079 A1 2/2009 Nalley
2011/0092345 A1 4/2011 Svenberg et al.
2011/0245048 A1 10/2011 Nalley
2012/0295774 A1 * 11/2012 Dalebout ..... A63B 21/00058 482/106
2013/0288859 A1 * 10/2013 Watterson ..... A63B 24/0062 482/8
2014/0162855 A1 * 6/2014 Beckman ..... A63B 21/065 482/139
2014/0296040 A1 * 10/2014 Mobley ..... A63B 21/078 482/104
2015/0251041 A1 * 9/2015 Smith ..... A63B 24/0087 482/98
2016/0059064 A1 * 3/2016 Smith ..... A63B 21/0728 482/5
2016/0089560 A1 * 3/2016 Smith ..... A63B 24/0087 482/108
2016/0184623 A1 * 6/2016 Moran ..... A63B 21/075 482/8
2018/0133538 A1 * 5/2018 Jones ..... A63B 21/075
2019/0299047 A1 * 10/2019 Nalley ..... A63B 21/0726

* cited by examiner

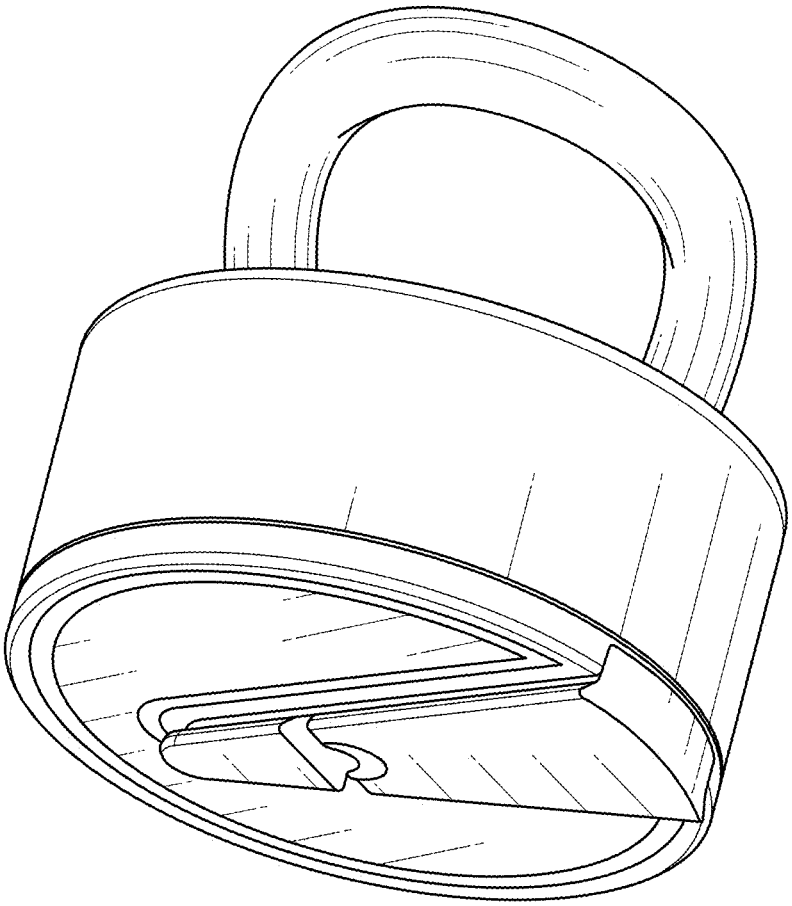
FIG. 17
NEW

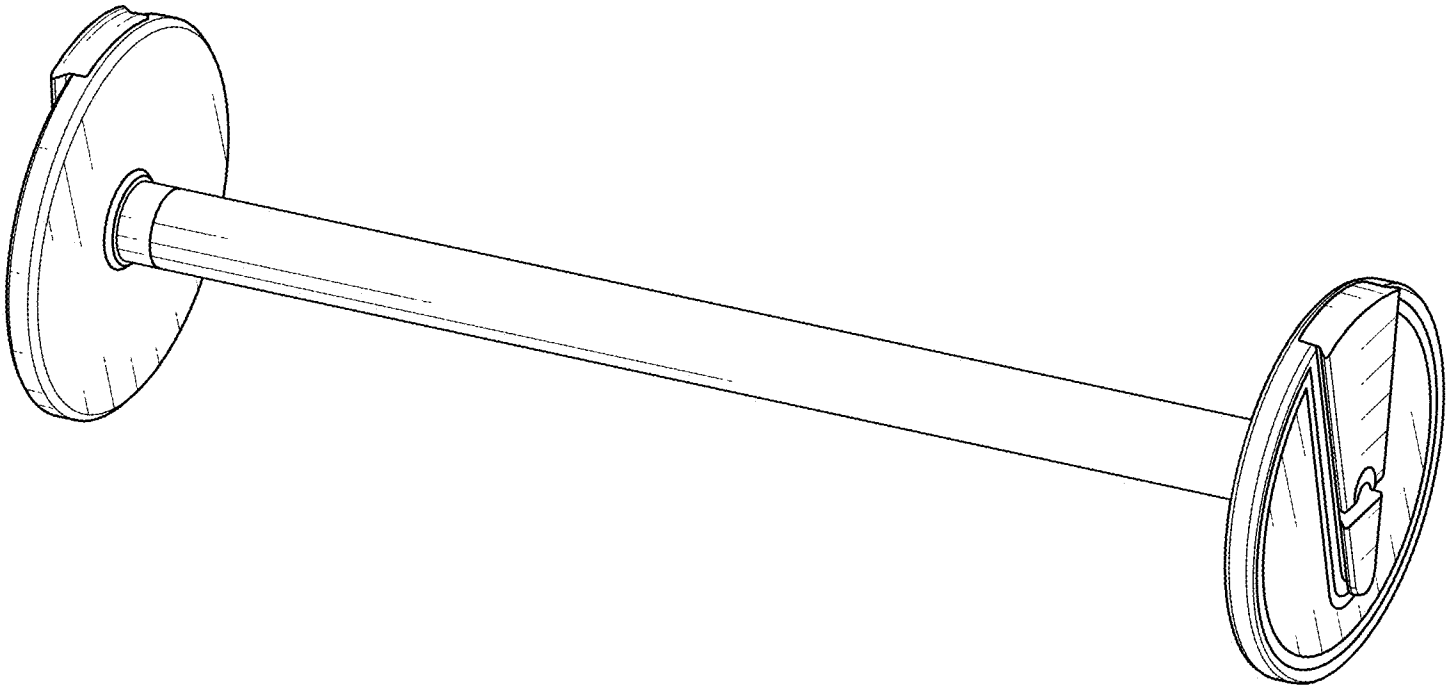
FIG. 18
NEW

ELECTRONICALLY ACTUATED DUMBBELL WEIGHT TRAINING DEVICE HAVING SELECTIVELY CONNECTED WEIGHT PLATES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention relates to a versatile dumbbell of the type commonly found in a fitness center to be used as a weight training device. The dumbbell is adapted to carry a set of weight plates that are detachably and selectively connected to one another by means of electric motors (e.g., stepper motors) that are located in locking cartridges carried by the weight plates and selectively activated by a user at a touch display so that the gross weight of the dumbbell can be incrementally varied and thereby tailored to fit a weight training program of the user.

2. Background Art

A dumbbell is a weight training device that has long been used by body builders and exercise conscious individuals to improve their physical strength and appearance as part of a weight training program. Such a dumbbell typically includes a cylindrical gripping handle that carries a pair of weight plates at opposite ends thereof. In this regard, the weight plates are fixedly connected to the ends of the gripping handle. Should the user wish to increase the weight to be lifted, he must find an altogether different dumbbell. In other words, there is no easy way for the user to selectively adjust or progressively change the weight of a conventional dumbbell to be used during a workout, such that the gross weight of the dumbbell remains the same at all times.

As a consequence of the foregoing, the fitness center or the user (should he elect to exercise at his home, office or elsewhere) must maintain many different dumbbells having different gross weights. Accordingly, the cost to acquire a variety of dumbbells and the space consumed as a result thereof are undesirably increased. Moreover, the user's ability to easily and quickly expand his personal weight training program is hampered by the requirement to have ready access to such different dumbbells.

One example of an improved easy-to-use dumbbell which overcomes the aforementioned problems is available by referring to U.S. Pat. No. 7,588,520 issued to Mark Nalley on Sep. 15, 2009. Another example of an improved dumbbell which overcomes the aforementioned problems is available by referring to U.S. patent application Ser. No. 15/944,434 filed by Mark Nalley on Apr. 3, 2018. Each of the patent and patent application discloses a dumbbell including a plurality of weight plates having locking cartridges and respective locking pins therein that are manually and selectively operated to connect any number of the weight plates to one another to thereby change the gross weight carried by the dumbbell to meet the needs of the user.

What would now be advantageous is to improve these dumbbells by way of an electronically actuated dumbbell having a plurality of weight plates containing respective electric motors by which the movements of the locking pins are initiated by the motors to cause the weight plates to be selectively and detachably connected to one another and lifted together.

SUMMARY OF THE INVENTION

In general terms, an improved electronically actuated dumbbell is disclosed of the kind that is typically found in a fitness center to be used as a weight training device. The present improvement advantageously permits a user to quickly and electrically vary the gross weight of the dumbbell by adding or removing different weight plates. The dumbbell includes a pair of disc-like collars connected to opposite ends of a cylindrical gripping handle. One or more disc-like weight plates are detachably connected to each other and to the pair of collars. Each weight plate has opposing inside and outside faces. A V-shaped coupling slot is recessed into the inside face of each weight plate, and a V-shaped coupling body extends from the outside face of each weight plate opposite the coupling slot. The coupling slot at the inside face of an adjacent additional weight plate to be added to the dumbbell to increase the weight thereof is sized and shaped to slidably receive therewithin the coupling body at the outside face of an existing weight plate being carried by the dumbbell such that the additional and existing weight plates are detachably connected together so as to lie face-to-face one another.

An electronic locking cartridge is located within a cartridge cavity that extends through each weight plate. The electronic locking cartridge received within the cartridge cavity includes a locking pin and an electric motor (e.g., a stepper motor) that is coupled to the locking pin by way of a rotatable switch arm. The actuation of a motor from the locking cartridge of the additional weight plate to be added to the dumbbell causes the switch arm to rotate and the locking pin to be pushed outwardly from the locking cartridge and through a coupling channel that runs laterally across the coupling body of the existing weight plate. The receipt of the locking pin through the coupling channel prevents a separation of the coupling body of the existing weight plate from the coupling slot of the adjacent additional weight plate, whereby the additional weight plate is detachably connected face-to-face to the existing weight plate to increase the weight of the dumbbell.

When the polarity of the electric motor is reversed, the switch arm will rotate in an opposite direction, and the locking pin of the electronic locking cartridge of the additional weight plate is correspondingly pulled inwardly of the locking cartridge so as to ride out of the coupling channel in the coupling body of the existing weight plate. Accordingly, the V-shaped coupling body of the existing weight plate can now be easily lifted out of and separated from the V-shaped coupling slot of the additional weight plate, whereby the existing weight plate is disconnected from the additional weight plate.

An electrical connector that lies at the bottom of each weight plate is connected to the electric motor thereof by a ribbon cable. An electronics housing that is connected between the pair of collars between which the gripping handle of the dumbbell extends has an electric connector lying at the bottom thereof. The dumbbell is configured to be received in and supported by a portable battery management and electronics control tray, such that the electrical connectors at the bottoms of the weight plates are connected to respective electrical contacts located on first and second plate buses of the tray, and the electrical connector lying at the bottom of the electronics housing between the collars is connected to an electrical contact on a handle bus of the tray. The tray includes a touch screen activated display and a graphical user interface by which the user can manually designate the gross weight of the dumbbell to be lifted during his exercise. A primary processor of the tray cooperates with a motor controller so that electrical motor control signals are supplied via the first and second plate buses by which to activate the electric motors of the particular weight plates which must be carried by the dumbbell to achieve the weight lifting objective of the user. The primary processor of the tray communicates with a sensor (e.g., an accelerometer) of the electronics housing by way of the handle bus to monitor the direction in which the dumbbell is being moved by the user during his exercise.

BRIEF DESCRIPTION OF THE DRAWINGS

*FIG. 17 is a perspective view of an electronically actuated adjustable kettlebell.*

*FIG. 18 is a perspective view of an electronically actuated adjustable barbell.*

DESCRIPTION OF THE PREFERRED EMBODIMENT

Figure 1:
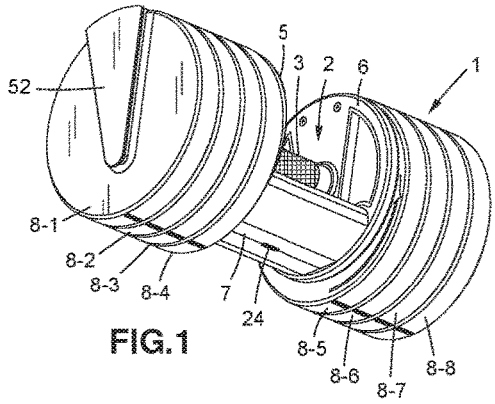
FIGS. 1 and 2 are perspective views illustrating an electronically actuated adjustable weight dumbbell having a plurality of weight plates that are adapted to be selectively and detachably connected face-to-face one another at opposite ends of a gripping handle assembly to change the gross weight of the dumbbell.
Figure 2:
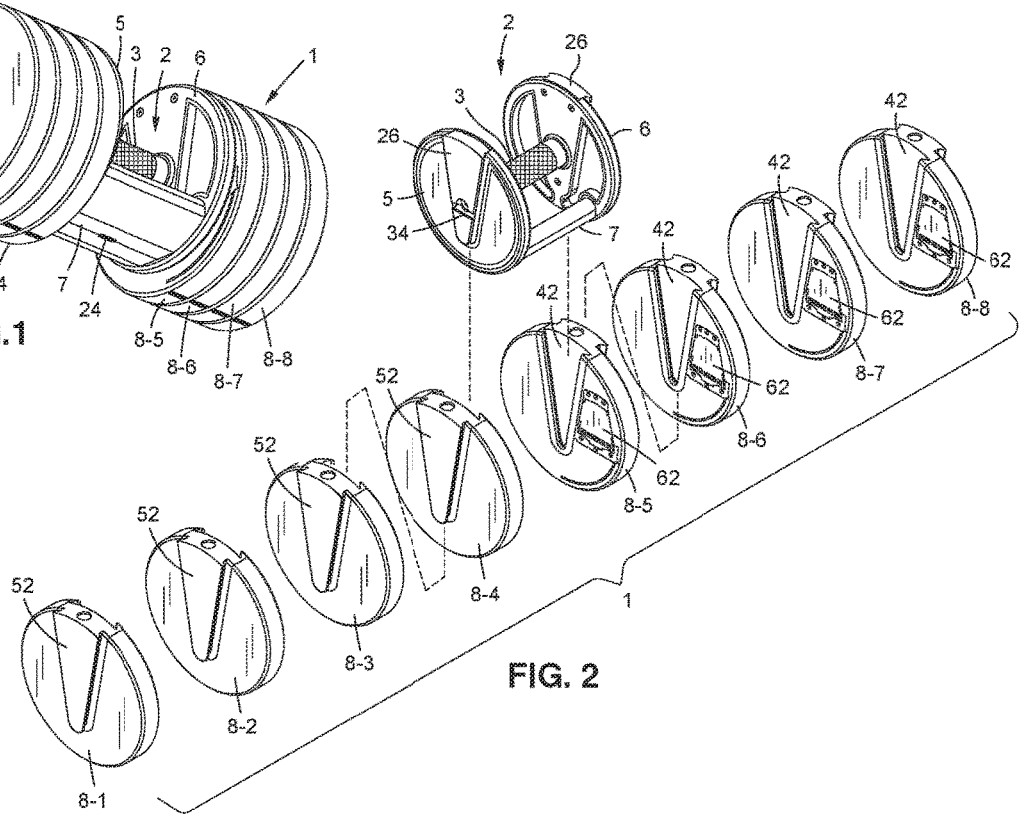

Referring initially to FIGS. 1 and 2 of the drawings, there is shown a unique, electronically actuated dumbbell 1 of the type to be used as a personal exercise and weight training device. Thus, the dumbbell 1 will be typically found at a fitness center or at home to be repeatedly lifted by one seeking to improve his physical appearance, strength and conditioning. Although it is contemplated that the dumbbell 1 shown in FIGS. 1 and 2 will be grasped in a single hand of a user, the teachings of this invention are also applicable to both a kettlebell (*as shown in FIG. 17*) and to a barbell device (*as shown in FIG. 18*) of the type to be grasped and lifted with both hands of the user.

The dumbbell 1 has a handle assembly 2 including a cylindrical gripping handle 3 that extends between and is connected to opposing disc-like collars 5 and 6. The handle 3 of the handle assembly 2 is sized to be gripped within a single hand of a user. In the event that the teachings of this invention are applied to a barbell, the length of handle 3 will be extended to accommodate both hands of the user. Also extending between the opposing collars 5 and 6 of handle assembly 2 is an electronics housing 7, the details of which will soon be explained. A variable number of (e.g., eight) identical weight plates designated 8-1 . . . 8-8 can be detachably connected to each other and to the collars 5 and 6 at opposite ends of the gripping handle 3 depending upon the experience of the user and the weight lifting exercise in which he will be engaged. During use of the dumbbell 1, any number of a first stack consisting of half of the total weight plates (e.g., 8-1 . . . 8-4) is coupled to one of the collars 5, and any number of a second stack consisting of the remaining number of weight plates (e.g., 8-5 . . . 8-8) is coupled to the other collar 6. By virtue of being able to vary the number of weight plates 8-1 . . . 8-8 to be carried by dumbbell 1, the gross weight of the dumbbell can be selectively and incrementally changed so as to be tailored to conform to the weight training program of the user.

Each of the weight plates 8-1 . . . 8-8 is preferably cast from metal and has a generally round, disc-like body with an ideal thickness of ⅝ of an inch. The weight plates 8-1 . . . 8-8 shown in FIGS. 1 and 2 have an identical shape and weight. However, the number of weight plates to be carried by the dumbbell 1 and the (same or different) weight and shape of each is a matter of personal choice as are necessary to meet the needs of the individual during his weight lifting exercise.

Figure 4:
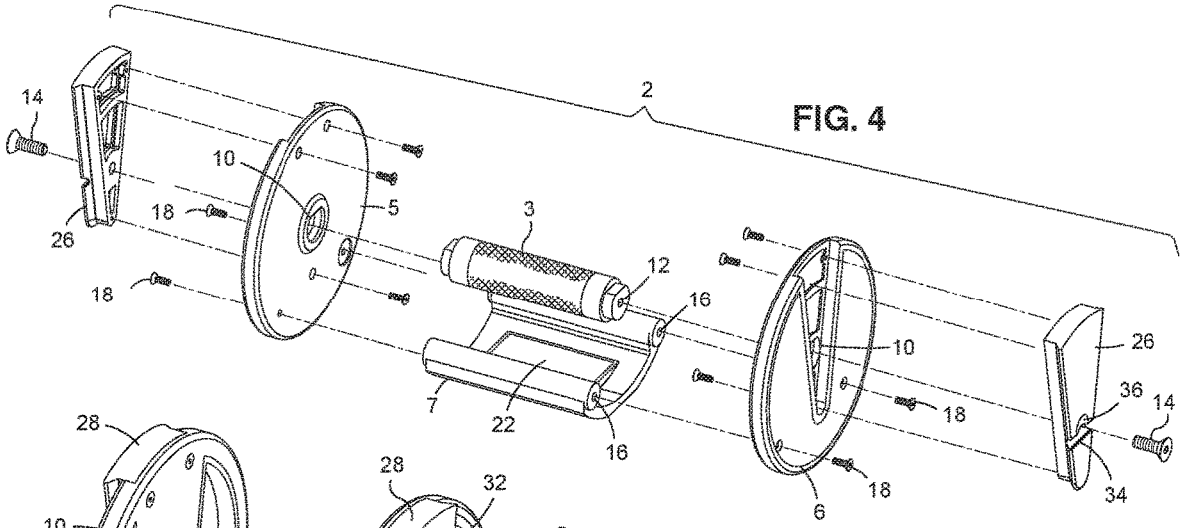
FIG. 4 is an exploded view of the gripping handle assembly of FIG. 3.
Figure 3:
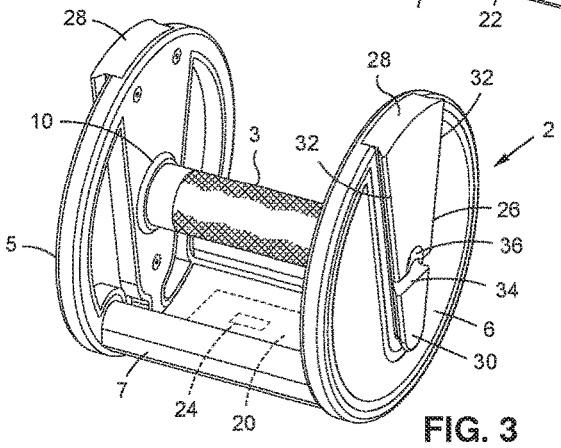
FIG. 3 is a perspective view of the gripping handle assembly of the dumbbell shown in FIGS. 1 and 2.
Figures 5, 6, 7:
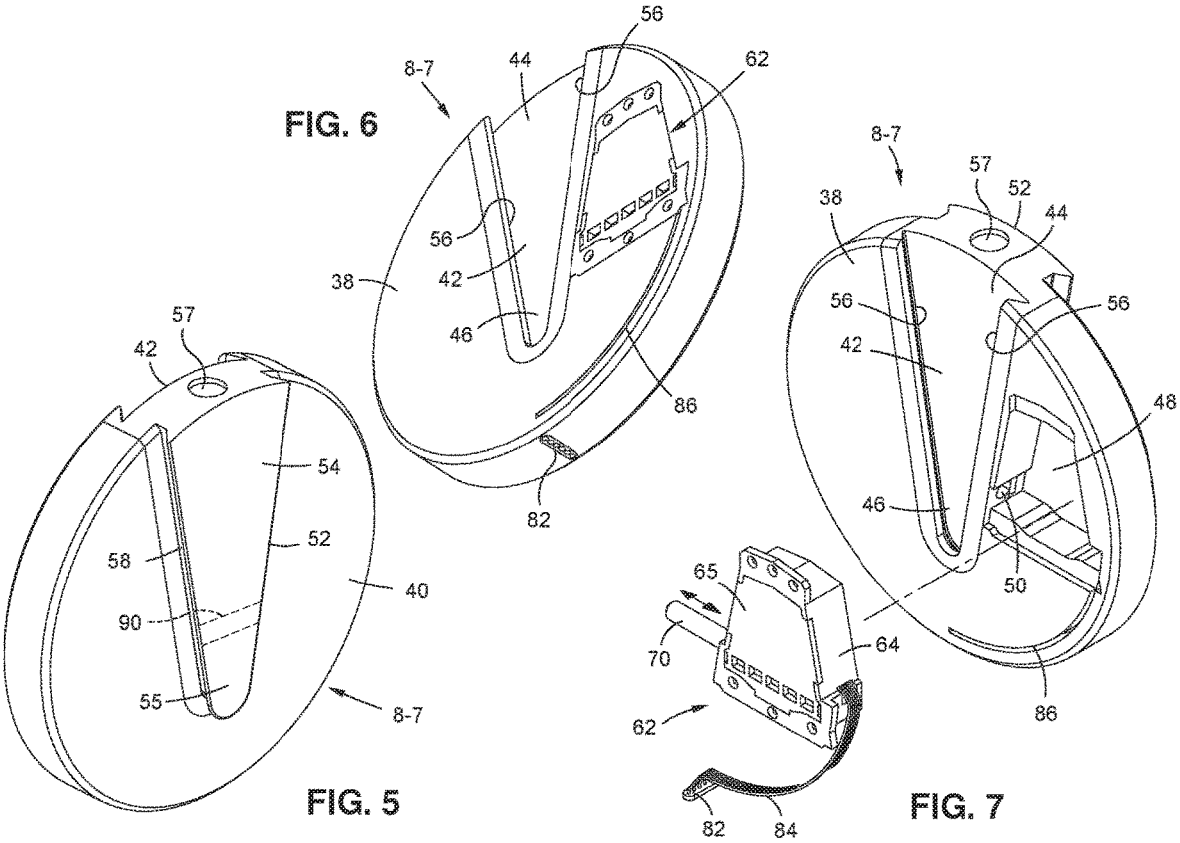
FIG. 5 is a perspective view of one of the plurality of weight plates from the electronically actuated dumbbell showing an outside face of the weight plate.
FIG. 6 is a perspective view of the weight plate of FIG. 5 showing an inside face thereof.
FIG. 7 is a perspective view of the weight plate of FIG. 6 showing a cartridge cavity formed therein and an electronic locking cartridge to be received within the cartridge cavity.

FIGS. 3 and 4 of the drawings show the handle assembly 2 of the electronically actuated dumbbell 1 with both of the first and second stacks of weight plates removed therefrom so that only the gripping handle 3 and the electronics housing 7 are connected between the opposing collars 5 and 6. Each of the disc-like collars 5 and 6 has a (e.g., round) coupling hole 10 extending therethrough. The coupling holes 10 are sized and shaped to receive therewithin opposite ends of the cylindrical gripping handle 3. Each end of the gripping handle 3 has a threaded hole 12 running axially therethrough in which to receive a threaded mounting bolt 14 for holding the handle 3 in place between collars 5 and 6.

The electronics housing 7 has a curved (e.g., injection molded) body that lies at the bottom of the handle assembly 2. A pair of threaded holes 16 are formed at each of the opposite ends of the electronics housing 7. The threaded holes 16 receive threaded fasteners 18 therein to hold the electronics housing 7 in place between the collars 5 and 6. A pocket 20 is recessed into the electronics housing 7 in which the electronics 22 (e.g., a battery, accelerometer, memory and processor) are carried so as to enable a user to selectively and electrically connect a desired number of weight plates to the handle assembly 2 and to each other to correspondingly adjust the gross weight of the dumbbell 1. A dual contact point electrical (e.g., pogo pin) connector 24 lies at the bottom of the electronics housing 7 and communicates with the electronics 22 being carried therewithin.

Each of the opposing collars 5 and 6 of the handle assembly 2 includes a tapered, generally V-shaped coupling body 26 that is held in place by fasteners so as to project outwardly from and run diagonally along an outside face of the collars. Each V-shaped coupling body 26 has a relatively wide head 28 that lies adjacent the outside edge of a corresponding one of the collars 5 and 6 and a relatively narrow tail 30 that lies radially inward from the head 28. A guide rail 32 runs along each of the opposing sides of each of the outwardly projecting V-shaped coupling bodies 26.

Locking pin extension channel 34 runs laterally across each V-shaped coupling body 26 so as to lie between the relatively wide head 28 and the relatively narrow tail 30 thereof. A hole 36 is formed through each of the coupling bodies 26 at the outside face of each of the collars 5 and 6 of the handle assembly 2. The holes 10 and 36 through the collars 5 and 6 and the coupling bodies 26 are axially aligned to receive the aforementioned threaded mounting bolts 14 for receipt by the threaded holes 12 at opposite ends of the gripping handle 3 by which to hold the handle in place between the opposing collars 5 and 6.

Details of the identical disc-like weight plates (designated 8-1 . . . 8-8 in FIG. 2) to be selectively and detachably connected to each other and to one or the other of the collars 5 and 6 at opposite ends of the gripping handle 3 of the electronically actuated dumbbell 1 are now described while referring to FIGS. 5-8 of the drawings. Each weight plate (e.g., 8-7) includes opposing inside and outside faces 38 and 40. A diagonally extending, tapered and generally V-shaped coupling slot 42 is recessed into the inside face 38 of each weight plate. Each V-shaped coupling slot 42 has a relatively wide head 44 that lies adjacent the outside edge of the weight plate 8-7 and a relatively narrow tail 46 that lies radially inward from the head 44. A locking cartridge cavity 48 (best shown in FIG. 7) extends completely through the weight plate 8-7 between the inside and outside faces 38 and 40 thereof to receive a soon to be described electronic locking cartridge 62 therewithin. A relatively narrow locking pin receiving opening 50 (also best shown in FIG. 7) extends between the cartridge cavity 48 and the V-shaped coupling slot 42.

A diagonally extending, tapered and V-shaped coupling body 52 (best shown in FIG. 5) projects outwardly from the outside face 40 of weight plate 8-7 so as to lie opposite the coupling slot 42 that is recessed within the inside face 38. The V-shaped coupling body 52 of the weight plate 8-7 has a size and shape that match the size and shape of the opposing coupling slot 42 as well as the V-shaped coupling bodies 26 which project outwardly from the collars 5 and 6 that are connected to opposite ends of the gripping handle 3 of handle assembly 2. Like the V-shaped coupling slot 42 at the inside face 38 of weight plate 8-7, the V-shaped coupling body 52 at the outside face 40 has a relatively wide head 54 that lies adjacent the outside edge of the weight plate 8-7 and a relatively narrow tail 55 that lies radially inward from the head 54. A mounting hole 57 is formed through the head 54 at the top of the coupling body 52 in which to receive an indicator plug (not shown) to visually designate the weight of the weight plate.

The recessed V-shaped coupling slots 42 and the outwardly projecting V-shaped coupling bodies 52 at opposite inside and outside faces 38 and 40 of each of the weight plate 8-1 . . . 8-8 of FIG. 2 are sized and shaped relative to each other so that the coupling body 52 at the outside face 40 of any one weight plate is slidable downwardly towards to be received by and mated to the coupling slot 42 at the inside face 38 of any other adjacent weight plate, whereby the weight plates are detachably connected face-to-face one another to be lifted by the dumbbell 1. To facilitate the sliding connection and mating engagement of a coupling body 52 to a coupling slot 42 so that adjacent weight plates are held face-to-face, locking grooves 56 are formed along the opposite sides of each V-shaped coupling slot 42 within which to slidably receive and releasably capture respective guide rails 58 that run along opposite sides of each V-shaped coupling body 52. The slidable mating engagement of a coupling body 52 and the guide rails 58 thereof from one weight plate to a coupling slot 42 and the locking grooves 56 of an adjacent weight plate is commonly referred to as a dove-tail connection.

In this same regard, weight plates (e.g., designated 8-4 and 8-5 in FIGS. 1 and 2) from each of the aforementioned first and second stacks of weight plates are detachably connected to respective ones of the collars 5 and 6 that are connected to opposite ends of the gripping handle 3 of the handle assembly 2. That is, the V-shaped coupling bodies 26 that project outwardly from the collars 5 and 6 are slideable downwardly towards and removably received by the V-shaped coupling slots 42 that are recessed into the inside faces 38 of weight plates 8-4 and 8-5. By virtue of the guide rails 32 (of FIG. 3) that run along the sides of the coupling bodies 26 of the collars 5 and 6 and the locking grooves 56 (of FIG. 7) that are formed in the sides of the coupling slots 42 of the weight plates 8-4 and 8-5, the coupling bodies 26 are coupled to the coupling slots 42 by means of an identical dove-tail connection as described above.

Referring now to FIGS. 5-10 of the drawings, details are provided of the aforementioned electronic locking cartridge 62 that is operable for causing a first weight plate (e.g., designated 8-6 in FIGS. 9 and 10) being carried by the electronically actuated dumbbell 1 to be detachably and selectively connected to an additional (i.e., adjacent) weight plate (e.g., designated 8-7 of FIGS. 5-7) so that both weight plates 8-6 and 8-7 can be carried together by the dumbbell along with any other newly added weight plates as is necessary to suit the exercise requirements of the user. The locking cartridge 62 is removably received and retained within the locking cartridge cavity (designated 48 in FIG. 7) that is formed through each weight plate (e.g., 8-7). The electronic locking cartridge 62 of weight plate 8-7 and each of the other weight plates is identical and includes a (e.g., plastic) housing 64 that is closed by a cover 65. An elongated locking pin channel 66 (best shown in FIGS. 8 and 10) runs across the bottom of the housing 64 to communicate with an exit opening (not shown) of the locking cartridge 62. A locking pin 70 is slidably received within the locking pin channel 66 and adapted to be pushed or pulled reciprocally therethrough between retracted (best shown in FIG. 9) and extended (best shown in FIGS. 8 and 10) positions so as to be either moved towards or away from the V-shaped coupling slot 42 at the inside face 38 of the additional weight plate 8-7 so that the first weight plate 8-6 can be either connected to or disconnected from the additional weight plate 8-7.

The reciprocal displacement of the locking pin 70 of electronic locking cartridge 62 through locking pin channel 66 is controlled by an electric motor 72. By way of example only, one electric motor that is suitable to control the displacement of locking pin 70 is a reversible stepper motor Model No. TSM25-150 manufactured by Anaheim Automation of Anaheim, Calif. However, any other suitable motor (e.g., a servo motor or the like) may be used in place of the stepper motor. The stepper motor 72 herein described is ideally positioned directly above and coupled to the locking pin 70 by way of a rotatable switch arm 76 that is pivotally connected at one end thereof to the motor 72. Accordingly, a rotational force applied by the stepper motor 72 to the switch arm 76 causes a rotation of the switch arm 76 through an arc of about 90 degrees and a corresponding linear displacement of the locking pin 70 through the locking pin channel 66.

The opposite free end of the rotatable switch arm 76 includes a relatively wide switch head 78 that is located in and captured by a bore 80 that is formed near the outside end of the locking pin 70. A rotation of the switch arm 76 by the stepper motor 72 causes the switch head 78 to generate a pushing or pulling force within the bore 80 for correspondingly causing the locking pin 70 to slide back and forth through the locking pin channel 66 between its aforementioned retracted and extended positions.

The stepper motor 72 is electrically connected to a dual point electrical (e.g., a pogo pin) connector 82 by way of a ribbon cable 84 that runs through a ribbon cable channel 86 formed in the weight plate 8-7. The ribbon cable 84 extends from motor 72 and outwardly from the housing 64 of the electronic locking cartridge 62 to the electrical connector 82 which is mounted flush with the bottom of the weight plate 8-7.

Figure 9:
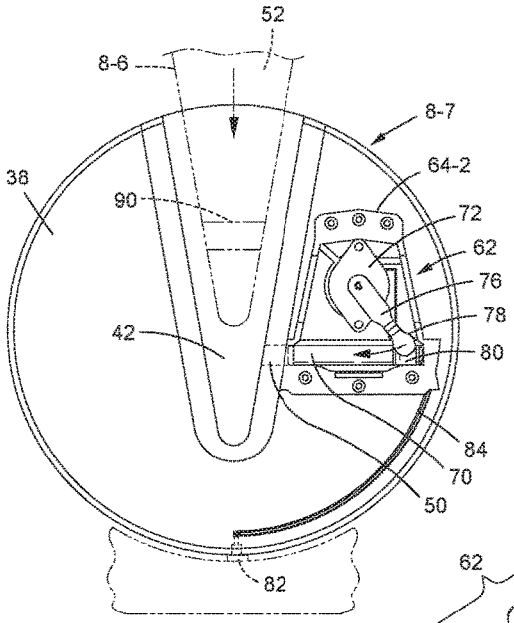
FIGS. 9 and 10 illustrate the weight plate of FIG. 7 having the electronic locking cartridge received in the cartridge cavity thereof and being detachably connected to an adjacent weight plate from the electronically actuated dumbbell shown in FIGS. 1 and 2.
Figure 10:
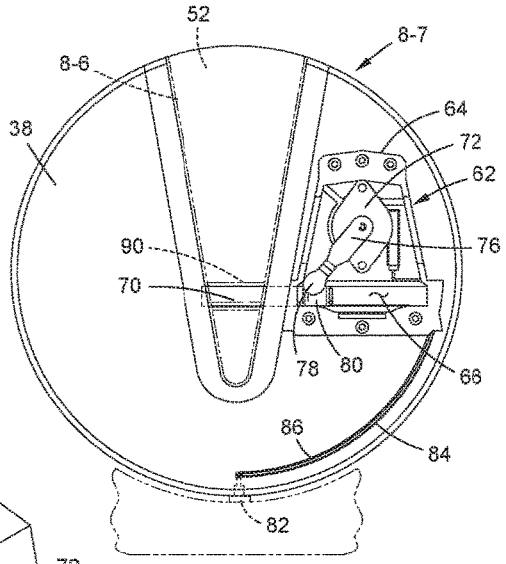
Figure 8:
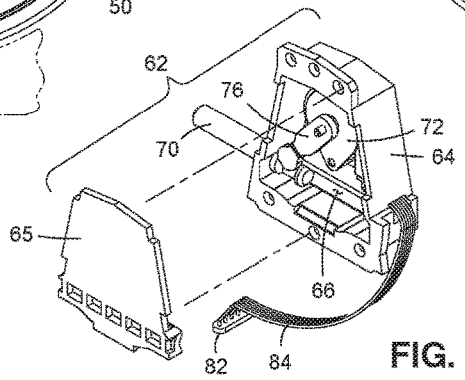
FIG. 8 is an exploded view of the electronic locking cartridge shown in FIG. 7.

In operation, when it is desirable to attach the first weight plate 8-6 already being carried by the electronically actuated dumbbell 1 to the additional weight plate 8-7 to increase the total weight of the dumbbell, the V-shaped coupling body 52 which projects from the first weight plate 8-6 is moved downwardly and into slidable receipt by the V-shaped coupling slot 42 that is recessed within the inside face 38 of the additional weight plate 8-7 (best shown in FIGS. 9 and 10). The first and additional weight plates 8-6 and 8-7 are now coupled together so as to lie adjacent and face-to-face one another.

Next, the stepper motor 72 within the electronic locking cartridge 62 of the additional weight plate 8-7 is selectively activated by the user (in a manner to be described hereinafter), whereby to cause a rotation of the rotatable switch arm 76 (in a clockwise direction illustrated by the directional arrow shown in FIG. 9) and a corresponding axial displacement of the locking pin 70 through the locking pin channel 66 to its extended position lying outwardly from the locking cartridge 62 and moving through the locking pin receiving opening 50. As is best shown in FIG. 10, in its extended position, the locking pin 70 is pushed (by the receipt of the switch head 78 of switch arm 76 by the bore 80 of locking pin 70) into an axially aligned coupling channel 90 that is formed in and runs laterally through the coupling body 52 of the first weight plate 8-6.

The receipt of the locking pin 70 from the locking cartridge 62 of the additional weight plate 8-7 by the coupling channel 90 of the coupling body 52 of the first weight plate 8-6 prevents an inadvertent removal of the coupling body 52 of the first weight plate 8-6 from the coupling slot 42 of the additional weight plate 8-7 whereby the first and additional weight plates will remain coupled to one another in order to be lifted together by the dumbbell 1. By detachably connecting one or more additional weight plates to each other in the manner just described, the user is able to selectively and incrementally increase the gross weight of the dumbbell 1 according to his needs.

Should it be desirable to disconnect the first weight plate 8-6 from the additional weight plate 8-7 or disassemble the dumbbell 1, the stepper motor 72 of the locking cartridge 62 of the additional weight plate 8-7 is reversed, and the switch arm 76 thereof is rotated in a counter-clockwise direction (not shown). The locking pin 70 of the locking cartridge 62 of the additional weight plate 8-7 is correspondingly pulled to its retracted position inwardly of the locking cartridge by the switch head 78 of the switch arm 76. Accordingly, the locking pin 70 is withdrawn from the coupling channel 90 in the coupling body 52 of the first weight plate 8-6 and pulled into the locking pin channel 66 of the locking cartridge 62 of the additional weight plate 8-7. The coupling body 52 of the first weight plate 8-6 can now be pulled upwardly relative to and removed from the coupling slot 42 of the additional weight plate 8-7.

The collars 5 and 6 of the handle assembly 2 of the electronically actuated dumbbell 1 of FIGS. 1 and 2 are detachably connected to adjacent ones of the weight plates 8-4 and 8-5 in a manner that is substantially identical to that just described with respect to the coupling together of weight plates 8-6 and 8-7. That is, the V-shaped coupling bodies 26 of collars 5 and 6 are slidable downwardly and into receipt by respective V-shaped coupling slots 42 of weight plates 8-4 and 8-5. The stepper motors 72 (of FIG. 10) of the electronic locking cartridges 62 of the weight plates 8-4 and 8-5 are selectively activated by the user by which to cause the locking pins 70 of locking cartridges 62 to be pushed into receipt by respective locking pin extension channels 34 (of FIG. 3) that are formed in and extend laterally across the coupling bodies 26 of collars 5 and 6. The locking pins 70 hold the collars 5 and 6 of the handle assembly 2 and the weight plates 8-4 and 8-5 coupled together and aligned face-to-face one another.

Figure 11:
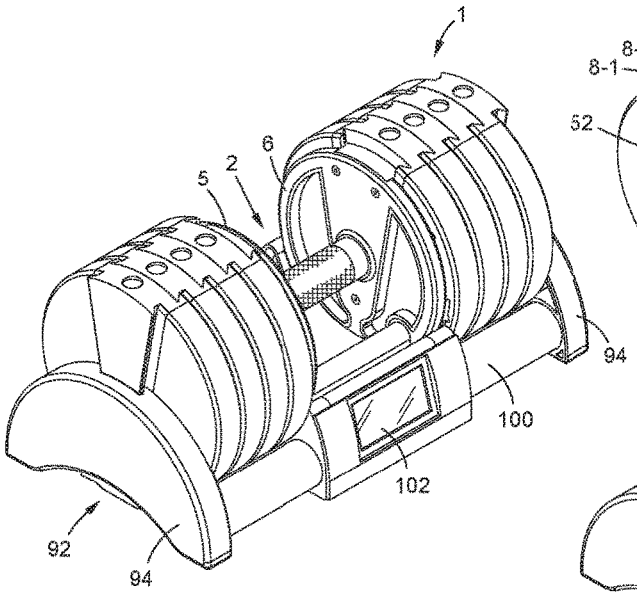
FIGS. 11-13 show the electronically actuated dumbbell of FIGS. 1 and 2 being received by and electrically interfaced with a portable battery management and electronics control tray.
Figure 12:
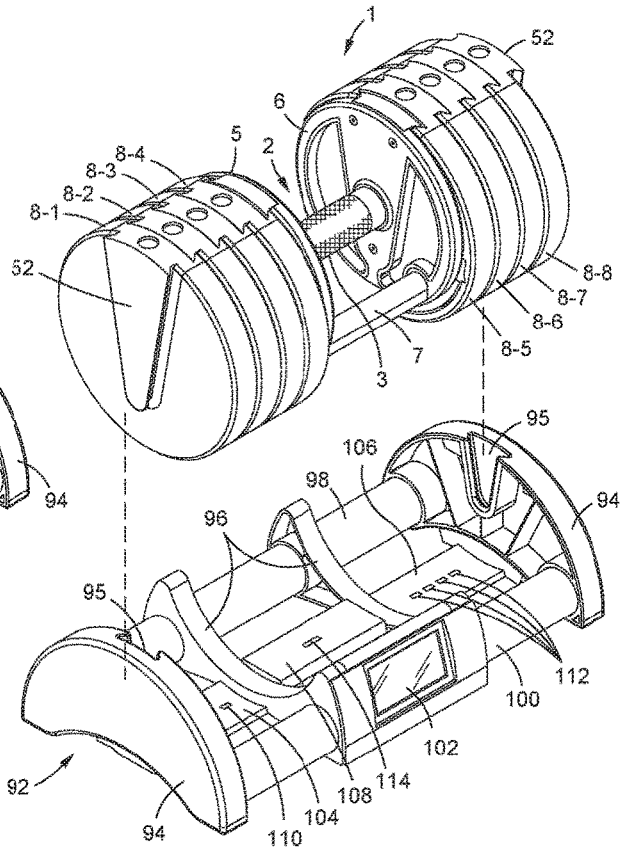
Figure 13:
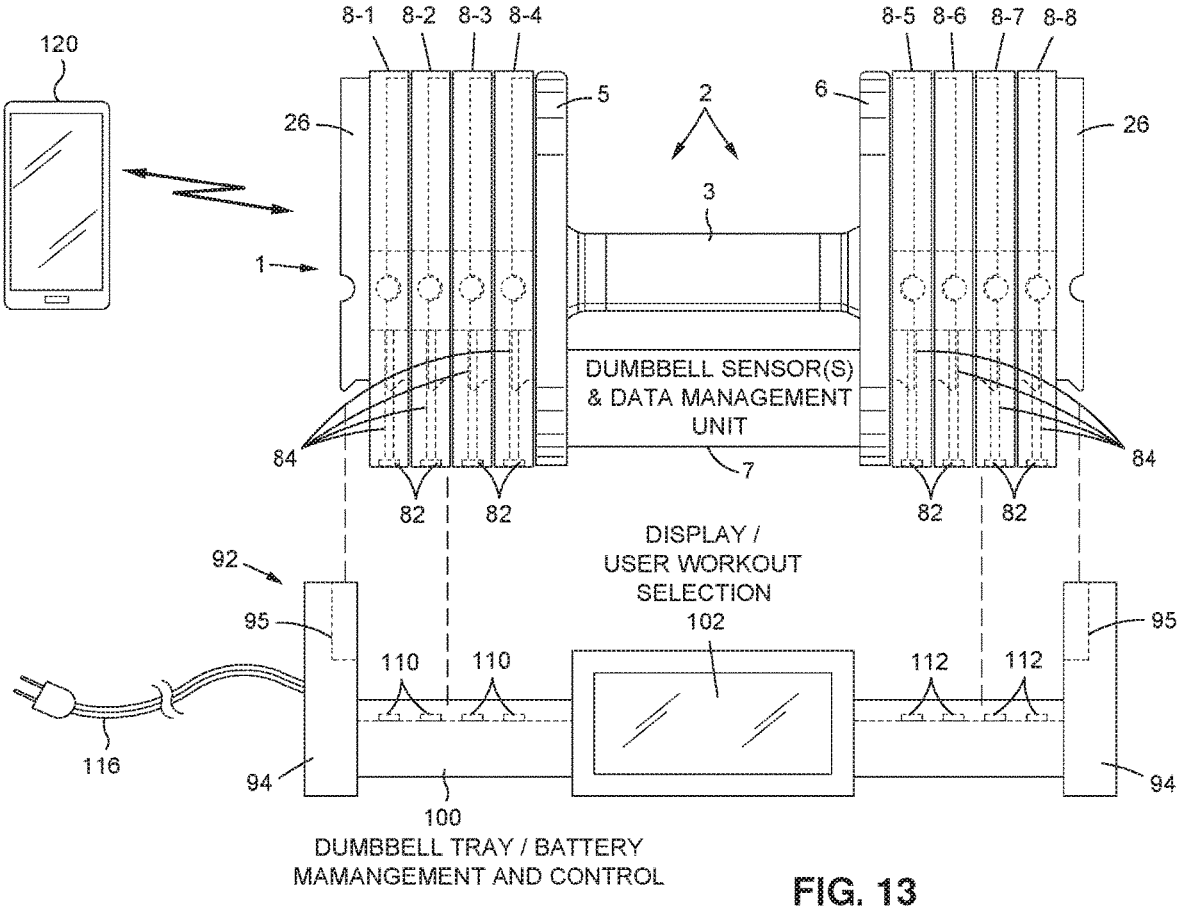

FIGS. 11-13 of the drawings show a portable battery management and electronics control tray 92 to be laid upon a flat surface at which to receive the electronically actuated dumbbell 1 therewithin. The dumbbell tray 92 includes a pair of side plates 94 located at opposite sides thereof and a pair of arcuate cradle arms 96 disposed in spaced parallel alignment with one another and located between side plates 94. A vertical slot 95 is formed at the inside of each side plate 94 to slidably receive downwardly therewithin the V-shaped coupling bodies 52 from the first and the last of the weight plates 8-1 and 8-8 of the first and second stacks of weight plates to thereby stabilize and hold the dumbbell 1 in place within the dumbbell tray 92.

Extending through the back of the cradle arms 96 and lying between the side plates 94 is a tubular plate rest 98 against which the weight plates 8-1 . . . 8-8 are supported when the dumbbell 1 is seated upon the arcuate cradle arms 96 of tray 92. Extending through the front of the cradle arms 96 and lying between the side plates 94 is a tubular display support 100. A digital display 102 is held at the front of the tray 92 by the display support 100 so as to be visually accessible to and manually engaged by the user. By way of example, the display 102 is a touch screen activated display.

As is best shown in FIG. 12, a first outside plate bus 104 lies at the bottom of the portable battery management and electronics control tray 92 between one of the pair of cradle arms 96 and one of the pair of side plates 94. A second outside plate bus 106 lies at the bottom of the tray 92 between the second of the pair of cradle arms 96 and the second of the pair of side plates 94. An intermediate handle bus 108 lies at the bottom of the tray 92 between the pair of cradle arms 96. A first set of dual point electrical contacts 110 (only one of which being shown) lies on the first outside plate bus, a second set of dual point electrical contacts 112 lies on the second outside plate bus 106, and a single dual point electrical contact 114 lies on the intermediate handle bus 108.

Each of the dual point electrical contacts 110, 112 and 114 is preferably pressure responsive. By way of example only, the contacts 110, 112 and 114 may be spring biased pogo pins. The number of dual point electrical contacts 110 and 112 located on respective ones of the outside plate buses 104 and 106 corresponds to the maximum number (e.g., four) of weight plates that will be seated on each of the buses 104 and 106 when the electronically actuated dumbbell 1 is lowered into receipt by the dumbbell tray 92. In the example of FIGS. 11-13, all four of the first stack of weight plates 8-1 . . . 8-4 are seated on the first outside plate bus 104 so as to engage a corresponding total of four dual point electrical contacts 110 located thereon.

All of the second stack of four weight plates 8-5 . . . 8-8 are seated on the second outside plate bus 106 so as to engage a corresponding total of four dual point electrical contacts 112 located thereon. Because the electronics housing 7 that is carried at the bottom of the handle assembly 2 between the opposing collars 5 and 6 has a single dual point connector 24 located at the bottom thereof, there is only a single dual point electrical contact 114 located on the intermediate handle bus 108 to communicate with the electronics 22 of housing 7.

With the electronically actuated dumbbell 1 resting within its battery management and electronics control tray 92 to be seated upon the cradle arms 96 and make contact with the outside and intermediate buses 104, 106 and 108, the dual point electrical connector (designated 82 in FIG. 6) that is mounted flush with the bottom of each of the weight plates 8-1 . . . 8-8 is positioned so as to engage and apply a pressure to a respective dual point contact from each of the first and second sets of electrical contacts 110 and 112 (best shown in FIG. 13). Thus, each electric (i.e., stepper) motor 72 from each electronic locking cartridge 62 (of FIG. 8) of each of the weight plates 8-1 . . . 8-8 is electrically connected to a corresponding electrical contact 110 or 112 at the dumbbell tray 92 by way of a ribbon cable 84 and an electrical connector 82 so that the operation of the motor 72 can be selectively controlled by the user to enable pairs of adjacent weight plates to be connected to one another in the manner just disclosed.

Likewise, the single dual point electrical connector 24 (of FIG. 1) that is mounted flush with the bottom of the electronics housing 7 of the handle assembly 2 of the dumbbell 1 is positioned to engage and apply a pressure to the single dual point contact 114 from the third set of electrical contacts located on the intermediate handle bus 108. Thus, the electronics 22 (of FIG. 4) that are housed within the electronics housing 7 are electrically connected to the electrical contact 114 of the portable battery management and electronics control tray 92 by way of the electrical connector 24 so that the electronics 22 can be powered and controlled in a manner that will soon be described. To this end, FIG. 13 shows the dumbbell tray 92 to be connected to and powered by a source of external AC voltage by means of a conventional electrical power cord 116 by which to charge an internal battery (designated 138 in FIG. 15) of the tray 92.

The user can now input the weight to be lifted during his exercise by interacting either directly with the display 102 or remotely by using an app loaded into his cellphone 120. Referring initially in this regard to FIG. 14A, the user has manually accessed the touch screen feature of the display 102 of the battery management and electronics control tray 92 so as to log in and indicate that he wishes to select the total weight to be lifted. In FIG. 14B, the user is instructed to touch the screen 102 and designate the particular weight that will be lifted by the dumbbell. In FIG. 14C, the display 102 identifies for the user which weight plates will be lifted and the total weight he has designated corresponding thereto. In the present case, each of the weight plates and the handle assembly (designated 2 in FIG. 2) at which the dumbbell is lifted has an identical weight of 5 pounds. Therefore, in this example, the total weight being indicated by the display 102 is 35 pounds. FIG. 14D illustrates a representation of the dumbbell as it will be lifted along with the particular weight plates and the total weight to be lifted after the user has indicated the weight necessary to achieve his exercise objective.

Figure 15:
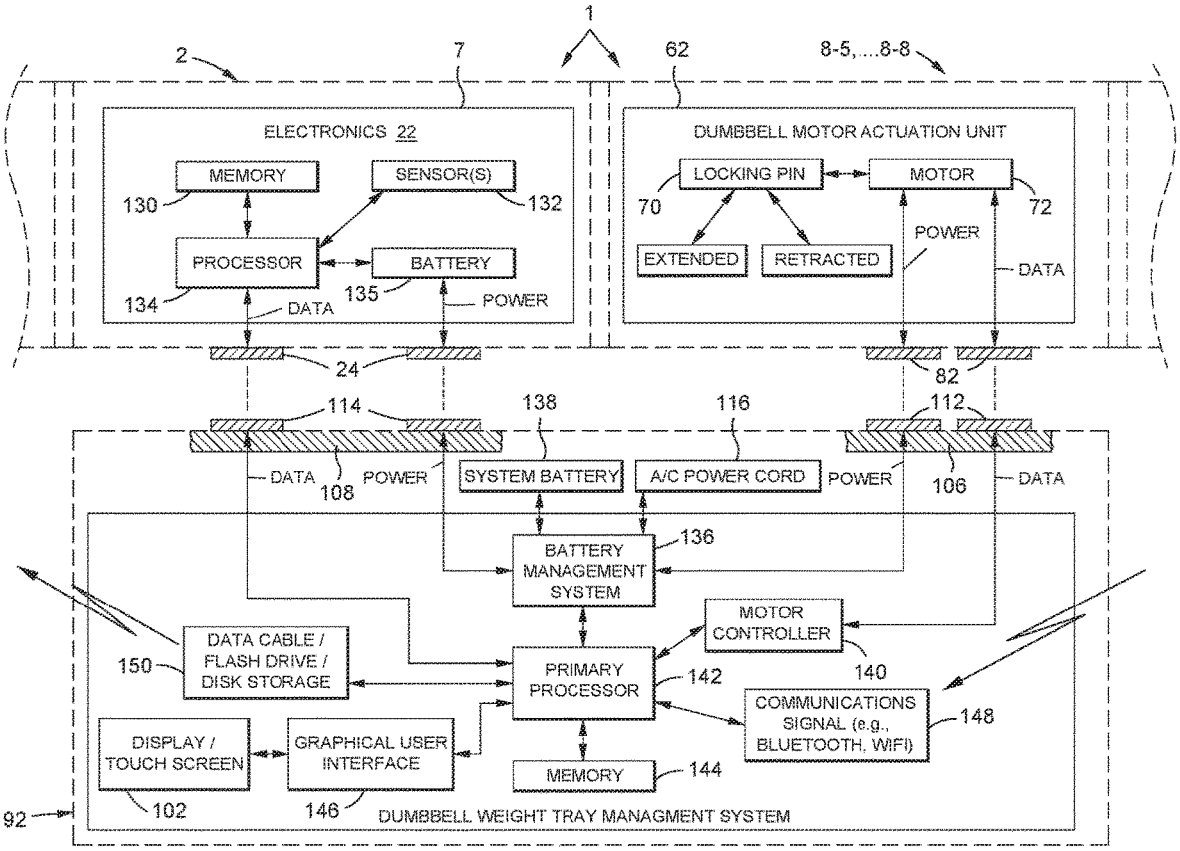
FIG. 15 is a block diagram to illustrate the electrical interface between one of the plurality of weight plates and the gripping handle assembly of the electronically actuated dumbbell shown in FIGS. 11 and 12 with the battery management and electronics control tray.

Turning now to FIG. 15 of the drawings, there is shown a block diagram to illustrate the electrical interconnection of the battery management and electronics control tray 92 to the handle assembly 2 and to each one of the second stack of weight plates 8-5 . . . 8-8 that are to be selectively connected to and lifted by the electronically actuated dumbbell 1. That is, when the dumbbell 1 is seated in the tray 92, individual Data and Power contact points of the dual point electrical connector 24 that is mounted at the bottom of the electronics housing 7 of the handle assembly 2 of the dumbbell 1 are electrically connected to respective Data and Power contact points of the dual point electrical contact 114 that lies on the intermediate handle bus 108 of the tray 92. Likewise, individual Data and Power contact points of the dual point electrical connector 82 that is mounted at the bottom of a selected one of the weight plates 8-5 . . . 8-8 shown in FIG. 15 are electrically connected to respective Data and Power contact points of a corresponding one of the dual point electrical contacts 112 from the second set of contacts that lies on the outside plate bus 106 at one side of the intermediate handle bus 108. In this same regard, Data and Power contact points of the dual point electrical convector 82 that is mounted at the bottom of a selected one of the weight plates 8-1 . . . 8-4 (not shown in FIG. 15) are electrically connected to respective Data and Power contact points of a corresponding one of the dual point electrical contacts 110 from the first set of contacts that lies on the outside plate bus 104 (also not shown in FIG. 15) at the opposite side of the intermediate handle bus 108.

The electronics 22 within the electronics housing 7 of the handle assembly 2 includes a (e.g., flash) memory 130 in which to store information concerning the user's lifting of the dumbbell 1 during his workout. One or more sensors 132, such as an accelerometer or the like, are responsive to variations in g-forces and directional changes of the dumbbell 1 to indicate the number, direction and speed of the user's exercise repetitions. A processor 134 of the handle assembly 2 links each sensor 132 to the memory 130. The processor 134 carried by the handle assembly 2 communicates with the primary processor 142 of the dumbbell tray 92 to exchange data by way of the Data contact points of the dual point electrical connector 24 and the opposing electrical contact 114. A (e.g., lithium-phosphate) battery 135 is connected to power the processor 134 of the handle assembly 134 to enable the user to access the information stored in the memory 130 at those times when the dumbbell 1 is separated from the dumbbell tray 92 to be lifted during a workout. The battery 135 communicates with a battery management system 136 of the tray 92 by way of the Power contact points of the dual point electrical connector 24 and the opposing dual point electrical contact 114. The battery management system 136 of the dumbbell tray 92 is powered by way of the power cord 116 (best shown in FIG. 13) so that an internal battery 138 of tray 92 is energized and the battery 135 of the handle assembly 2 is charged.

The electronic locking cartridge 62 of each weight plate 8-5 . . . 8-8 shown in FIG. 15 of the dumbbell 1 includes a previously described locking pin 70 that is pushed and pulled back and forth between its extended and retracted positions by means of the electric (e.g., stepper) motor 72 so that at least one weight plate of the dumbbell can be detachably connected to another in the manner disclosed earlier when referring to FIGS. 9 and 10. The motor 72 carried by the locking cartridge 62 is electrically connected to the battery management system 136 of the dumbbell tray 92 to receive battery power from the internal (e.g., lithium-phosphate) battery 138 of tray 92 by way of the Power contact points of the dual point electrical connector 82 of the weight plate and the opposing dual point electrical contact 112 of the dumbbell tray 92.

The motor 72 is also electrically connected to a motor controller 140 of the dumbbell tray 92 by way of the Data contact points of the dual point electrical connector 82 and the opposing dual point electrical contact 112. The motor controller 140 activates the electric motor 72 and identifies the direction and distance traveled by the locking pin 70 to its extended and retracted positions. In the case of a stepper motor, the motor controller 140 counts the number of steps moved by the motor in order to provide a corresponding indication of the distance traveled by the locking pin 70.

Figure 14A:
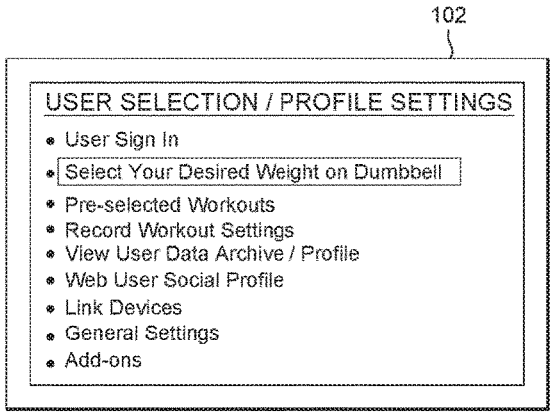
FIGS. 14A-14D illustrate a touch-actuated display of the battery management and electronics control tray of FIGS. 11-13 at which a user can selectively and tactilely designate the gross weight of and the corresponding number of weight plates to be lifted by the electronically actuated dumbbell.
Figure 14B:
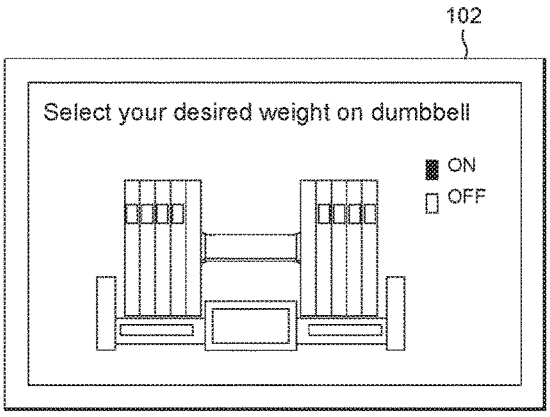
Figure 14C:
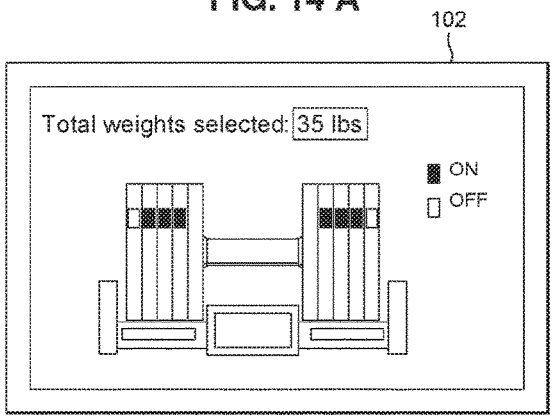
Figure 14D:
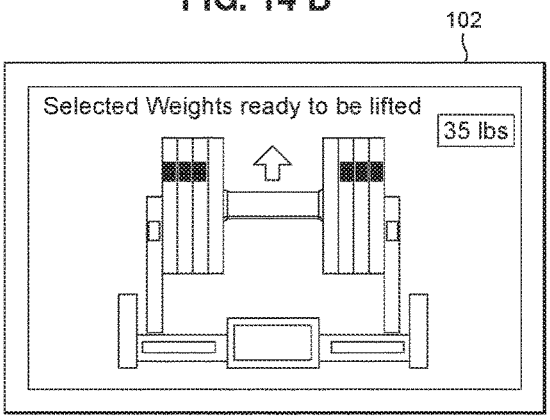

The battery management and electronics tray 92 of the electronically actuated dumbbell 1 includes a primary (i.e., master) processor 142 that communicates with an internal memory 144 to access a code stored therein by which to control the motor controller 140 and thereby cause the respective electric motors 72 from those weight plates 8-5 . . . 8-8 which will be selectively connected to one another to be activated depending upon the exercise objectives manually entered by the user at the touch interface display 102 (previously described while referring to FIGS. 14A . . . 14D). The display 102 is controlled by means of a conventional graphical user interface 146 connected between the display 102 and the primary processor 142 of tray 92. The code stored in the memory 144 and accessed by the primary processor 142 drives the graphical user interface 146.

Figure 16:
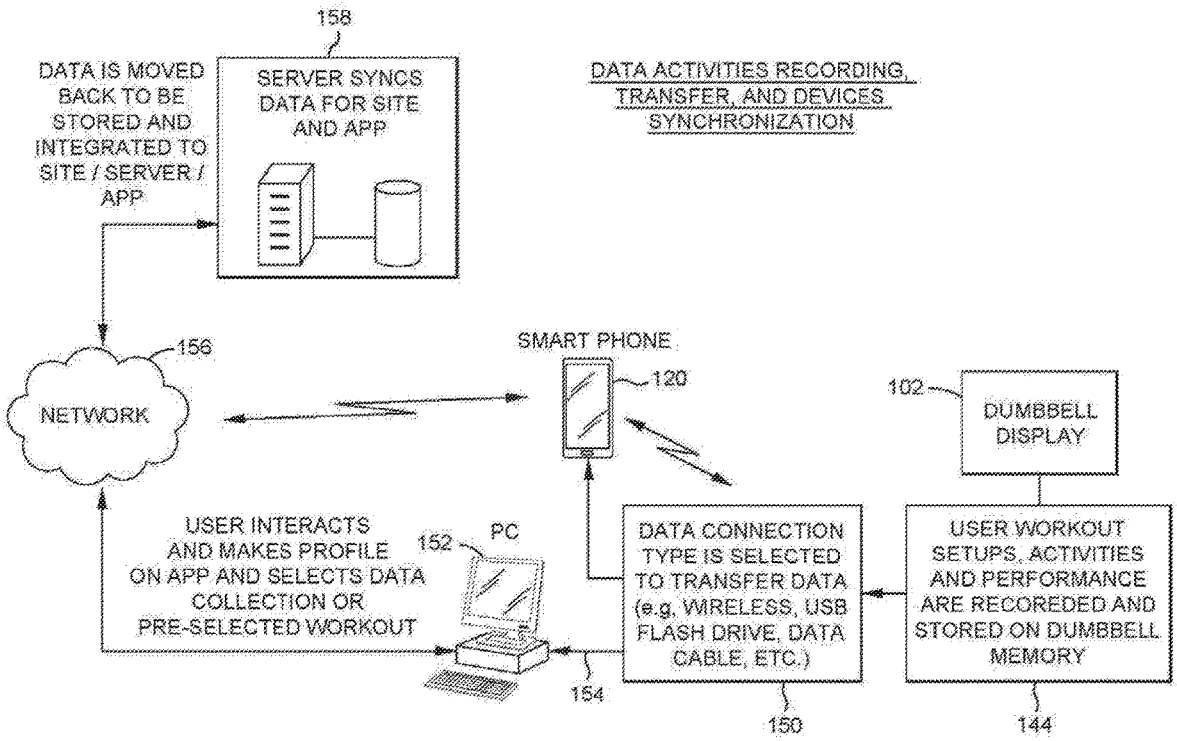
FIG. 16 is a block diagram to illustrate a data path for recording and transferring information regarding a user workout from the electronically actuated dumbbell to a cloud based server for online applications.

The portable battery management and electronics control tray 92 within which the dumbbell 1 is shown seated in FIG. 15 also includes a receiver 148 that is capable of receiving an external communications command signal sent by the user from his computer or cell phone (designated 120 in FIGS. 13 and 16). The receiver 148 communicates with the primary processor 142 to enable the user to remotely enter the gross weight to be lifted by the dumbbell 1 and cause the corresponding number of weight plates 8-5 . . . 8-8 to be connected together to meet his exercise objectives. As will be described in greater detail when referring to FIG. 16, the dumbbell tray 92 also has hardware 150 that enables the user to capture, store and transmit data concerning his workout to a remote personal computer or to a portable memory (e.g., a removable drive) thereof.

FIG. 16 of the drawings is a block diagram to illustrate a data transmission path by which the user may send information to a remote location concerning his workout that has been stored in the memory 144 of the battery management and electronics control tray 92 shown in FIG. 15. The memory 144 communicates with the hardware 150 of the dumbbell tray 92 by way of the primary processor 142. By way of example and depending upon the wishes of the user, the hardware 150 has transmission means (not shown) adapted to transmit the user's workout information to either a remote (e.g., home) computer 152 over an electrical cable 154 or to the user's cellphone 120 over a wireless (e.g., Bluetooth) communications path. As previously described, the user can also use an app on his cellphone 120 to communicate with the receiver (designated 148 in FIG. 15) of the dumbbell tray 92 to select a weight to be lifted and the weight plates to the connected together prior to his exercise.

The user's workout information can be transferred from his computer 152 or cellphone 120 to the internet or to a local network 156. From the network 156, the information is available, should the user so desire, to be compiled, correlated with information provided by other users, stored on a cloud based server 158, and made available for online applications including, but not limited to, transmission to social media, the website of his gym, or to a physical therapist.

The improvement of being able to selectively connect adjacent weight plates to one another by means of actuating electric motors carried by the weight plates has been disclosed above with respect to a dumbbell (or a barbell) having first and second stacks of weight plates that are coupled to opposite sides of an intermediate handle assembly. However, it is to be understood that the teachings of this invention and the advantages achieved therefrom are also applicable to a single, continuous stack of weight plates that are part of an exercise apparatus of the kind typically found in a gym, wherein a selected number of weight plates from the stack will be detachably connected together by activating the electric motors thereof so as to be raised in response to a pulling or pushing force applied to those weight plates selected from the stack by the user wishing to use the exercise apparatus.

The invention claimed is:

1. A weight training apparatus comprising*:* a plurality of weight plates, at least some of said plurality of weight plates to be detachably connected to one another and lifted during a weight training exercise,

[each of said plurality of weight plates having a first face and an opposite face,] *a first weight plate of the plurality of weight plates comprising* a coupling slot [recessed into said first face, and],

*a second weight plate of the plurality of weight plates comprising* a coupling body [extending from said opposite face, the coupling body of a first weight plate of said plurality of weight plates being] removably received within the coupling slot of [a second] *the first* weight plate[of said plurality of weight plates], whereby said first and second weight plates are detachably connected to one another and lifted together,

[each of the first and second weight plates of said plurality of weight plates also having] *the first weight plate further comprising* an electric motor housed therewithin and an electrical connector positioned thereon and configured to communicate with a source of motor control signals, said electrical [connectors] *connector* being connected [through said first and second weight plates] to said electric [motors] *motor* housed therewithin such that [each of said] *the* electric [motors] *motor* receives an electrical control signal [within a respective one of said first and second weight plates] by way of said electrical [connectors thereof] *connector* so as to be operable to cause the coupling body of said [first] *second* weight plate to be coupled to and retained within the[,] coupling slot of said [second] *first* weight plate to prevent a disconnection of said first and second weight plates from one another when said first and second weight plates are lifted together.

2. The weight training apparatus recited in claim 1, wherein said apparatus is a dumbbell *or barbell* having a handle assembly to which a lifting force is applied, said handle assembly having first and opposite sides, a first set of said plurality of weight, plates detachably connected to one another and coupled to the first side of said handle assembly, and a second set of said plurality of weight plates detachably connected to one another and coupled to the opposite side of said handle assembly.

3. The weight training apparatus recited in claim 2, wherein the handle assembly of said dumbbell *or barbell* includes a sensor that is responsive to the movement of said dumbbell *or barbell* when a lifting force is applied to said handle assembly to lift said dumbbell *or barbell* and a memory in which to store information regarding the movement of said dumbbell to which said sensor is responsive.

4. The weight training apparatus recited in claim 3, wherein said handle assembly also includes a processor to control a receipt by said memory of the information to which said sensor is responsive, a battery to provide power to said processor, and an electrical connector at which to receive electrical power by which to charge said battery.

5. The weight training apparatus recited in claim 1, wherein [each] *the* coupling slot and [each] *the* coupling body [of each of said first and second weight plates from said plurality of weight plates] has a V-shape.

6. The weight training apparatus recited in claim 5, wherein the V-shaped coupling slot [of each of said first and second weight plates from said plurality of weight plates] has a pair of sides lying opposite one another and a groove extending along each of said pair of sides, and the V-shaped coupling body [of each of said first and second weight plates] has a pair of sides lying opposite one another and a guide rail extending along each of said pair of sides, the guide [rails] *rail* at the pair of sides of the V-shaped coupling body of said [first] *second* weight plate being received within and sliding along the grooves at the pair of sides of the V-shaped coupling slot of said [second] *first* weight plate, whereby said guide, rails and said grooves are coupled to one another to establish a dove-tail connection therebetween.

7. The weight training apparatus recited in claim 1, [wherein each of said first and second weight plates also has a housing including] *further comprising* a locking pin [moving therethrough] *configured to move* between a retracted position [located inwardly of said housing] and an extended position [extending outwardly from said housing], the electric motor [of said second weight plate lying within the housing of said second weight plate and] cooperating with the locking pin [of the housing of said second weight plate] for causing the locking pin [of said second weight plate] to move to said extended position [and into the coupling slot of said second weight plate at which] to engage the [coupling body of said first] *the second* weight plate that is removably received by the coupling slot of said [second] *first* weight plate, whereby said first and second weight plates are detachably connected to one another.

[8. The weight training apparatus recited in claim 7, wherein the housing of said second weight plate also includes a rotatable switch arm pivotally connected to the electric motor within the housing of said second weight plate and coupled to the locking pin within the housing of said second weight plate, such that a force generated by the electric motor of said second weight plate causes said rotatable switch arm to rotate and said locking pin to be moved by said rotatable switch arm to said extended position relative to the housing of said second weight plate and into the coupling slot of said second weight plate at, which to engage the coupling body of said first weight plate, whereby said first and second weight plates are detachably connected to one another.]

9. The weight training apparatus recited in claim 1, wherein said first and second weight plates are detachably connected together so as to lie face-to-face one another when the coupling body of said [first] *second* weight plate is removably received by the coupling slot of said [second] *first* weight plate.

10. A combination comprising:

a dumbbell *or barbell* including a handle assembly having first and opposite sides, a first set of weight plates to be coupled to said handle assembly at the first side thereof and lifted by said dumbbell *or barbell* in response to a lifting force applied to said handle assembly, a second set of weight plates to be coupled to said handle assembly at the opposite side thereof to be lifted by said dumbbell *or barbell* with the first set of weight plates in response to the lifting force applied to said handle assembly, [each]

*a first* weight plate of said first [and] *set or said* second [sets] *set* of weight plates having a motor that is operable to cause the *first* weight [plates of said first set] *plate* to be detachably connected together [and the weight plates of said second set to be detachably connected together] *with a second weight plate of said first set or said second set of weight plates*; and a [dumbbell] tray within which said dumbbell *or barbell* is seated, said [dumbbell] tray including *or in communication with* a motor controller *configured* to generate motor control signals for receipt by [respective ones of] the [motors] *motor* of the first [and second sets of] weight [plates] *plate*, whereby the first [set of] *and second* weight plates are detachably connected together [and the second set of weight plates are detachably connected together].

11. The combination recited in claim 10, wherein [each] *the* motor [of each weight plate of each of the first and second sets of weight plates] is an electric motor.

12. The combination recited in claim 11, wherein [each] *the* electric motor [of each weight plate of each of the first and second sets of weight plates] is a stepper motor.

13. The combination recited in claim 11, [wherein a first weight plate of the first, and second sets of weight plates also has] *further comprising* a locking pin that is movable in a first direction so as to move into engagement with [a] *the* second weight plate [of the first and second sets, of weight plates], whereby said first and second weight plates are detachably connected together.

14. The combination recited in claim 13, wherein the locking pin [of said first weight plate of the first and second sets of weight plates] is also movable in an opposite direction so as to move out of said engagement with said second weight plate, whereby said first and second weight plates are disconnected from one another.

15. The combination recited in claim 14, wherein the electric motor of said first weight plate is coupled to said locking pin [thereof], said electric motor being operable to cause said locking pin to move relative to said first weight plate in said first and opposite directions and into and out of said engagement with said second weight plate.

16. The combination recited in claim 15, wherein the motor control signals generated by the motor controller of said [dumbbell] tray are electrical signals for receipt by [respective ones of] the electric [motors of the first and second sets of weight plates] *motor*, the electrical signal received by the electric motor of said first weight plate operating said electric motor and causing the locking pin [of said first weight plate] to move in one of said first or second directions.

[17. The combination recited in claim 16, further comprising a rotatable switch arm pivotally connected to the electric motor of said first weight plate and coupled to the locking pin thereof, said electric motor operating to cause said rotatable switch arm to rotate and said locking pin to move relative to said first weight plate in one of said first or second directions and into or out of said engagement with said second weight plate.]

[18. The combination recited in claim 17, wherein the electric motor, the rotatable switch arm, and the locking pin of the first weight plate of the first and second sets of weight plates is located in a housing that is received within a housing cavity formed in said first weight plate, said electric motor operating to cause said locking pin to move through said housing in one of said first or second directions and into or out of said engagement with said second weight plate.]

19. The combination recited in claim [17] *10*, wherein the first weight plate [of the first and second sets of weight plates] has an electrical connector connected to the electric motor thereof, and said [dumbbell] tray has an electrical contact to engage the electrical connector of said first weight plate when said dumbbell *or barbell* is seated in said [dumbbell] tray, [one of] the electrical signals generated by the [otor] *motor* controller [of said dumbbell tray] being supplied to and operating the electric motor of said first weight plate by way of the electrical connector of said first weight plate and the electrical contact of said [dumbbell] tray.

20. The combination recited in claim [11] *10*, [wherein said dumbbell tray includes] *further comprising* a touch activated display, a graphical user interface communicating with said touch activated display, and a processor connected between said graphic user interface and [each of] the electric [motors of said first and second sets of weight plates] *motor*, said touch activated display being responsive to touch-entered information that is indicative of a predetermined weight to be lifted by said dumbbell *or barbell* when said dumbbell is removed from said [dumbbell] tray, said processor controlling the operation of the [respective] electric [motors of the first and second sets of weight plates to be connected together] *motor* so as to correspond to the predetermined weight to be lifted by said dumbbell.

21. The combination recited in claim 20, wherein the handle assembly of said dumbbell *or barbell* includes a sensor that is responsive to the movement of said dumbbell when the lifting force is applied to said handle assembly to lift said dumbbell *or barbell* out of said [dumbbell] tray, a memory in which to store information regarding the movement of said[,] dumbbell *or barbell* to which said sensor is responsive, and a [dumbbell] processor electrically connected between the memory of said handle assembly and[,] the processor of said [dumbbell] tray.

22. The combination recited in claim 21, wherein the handle assembly of said dumbbell *or barbell* also includes a battery to power said [dumbbell] processor, and said [dumbbell] tray also includes a battery to power the processor of said dumbbell tray, said [dumbbell] tray receiving a supply of AC voltage by which to power the battery thereof and charge the battery of said handle assembly.

[23. The combination recited in claim 20, wherein each of the first and second sets of weight plates has an electrical connector connected to respective ones of the electric motors thereof, and said dumbbell tray has a plurality of electrical contacts electrically connected to said processor and engaging respective ones of the electrical connectors of the first and second sets of weight plates when said dumbbell is seated in said dumbbell tray, whereby said processor is electrically connected to the electric motor of each weight plate of the first and second sets of weight plates.]

24. The combination recited in claim 20, wherein said [dumbbell] tray also includes a receiver communicating with the processor of said [dumbbell] tray and adapted to receive a signal over a wireless communications path that is indicative of the predetermined weight to be lifted by said dumbbell when said dumbbell is[,] removed from said [dumbbell] tray.

25. A [dumbbell] *device* comprising*:* a handle [having first and opposite sides], a [first] set of weight plates to be coupled to said handle [at the first side thereof] and lifted [by said dumbbell] in response to a lifting force applied to said handle,

[a second set of weight plates to be coupled to said handle at the opposite side thereof to be lifted by said dumbbell with the first set of weight plates in response to the lifting force applied to said handle, each]

*a first* weight plate of said [first and second sets] *set* of weight plates having an electric motor located therewithin, [each] *the* electric motor receiving an electrical control signal within [a respective one of] the *first* weight [plates of said first and second sets of weight plates] *plate* so as to be operable to cause the [weight plates of said first set of weight plates] *first weight plate* to be detachably connected [together and the weight plates of said second set of weight plates to be detachably connected together] *to a second weight plate of the set of weight plates*, [wherein each of said first and second sets of weight plates has a first weight plate and an adjacent second weight plate and each] *the* first weight plate [of each of said first and second sets of weight plates] has therewithin a locking pin and a rotatable switch arm pivotally connected to said electric motor and coupled to said locking pin, the electric motor within the first weight plate [of each of said first and second sets of weight plates] operating to cause the rotatable switch arm to rotate and the locking pin within the first weight plate [of said first set of weight plates] to be moved [toward s] *towards* and into engagement with the [adacent] second weight [tplate of said first set of weight plates and the rotatable switch arm to rotate and the locking pin within the first weight plate of said second set of weight plates to be moved towards and into engagement with the adjacent second weight plate of said second set of weight plates] *plate*.

*26. The device of claim 25, wherein the device comprises an adjustable weight kettlebell.*

*27. The device of claim 25, wherein the device comprises an adjustable weight barbell.*

*28. A weight plate for an exercise device, the weight plate comprising:*

*a weighted body;*

*an electric motor positioned within the weighted body;*

*a locking pin configured to move between a retracted position and an extended position, wherein the electric motor is operably connected to the locking pin and configured to cause the locking pin to move between the retracted position and the extended position; and*

*an electrical connector disposed on a surface of the weighted body, the electrical connector communicatively coupled to the electric motor, and wherein the electric motor is configured to receive an electrical control signal by way of the electrical connector so as to be operable to cause the locking pin to move between the retracted position and the extended position.*

* * * * *